United States Patent
Naffziger et al.

(10) Patent No.: US 7,047,437 B2
(45) Date of Patent: May 16, 2006

(54) METHOD AND SYSTEM FOR DETECTING DROPPED MICRO-PACKETS

(75) Inventors: Samuel Naffziger, Fort Collins, CO (US); Donald C. Soltis, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 516 days.

(21) Appl. No.: 10/021,170

(22) Filed: Dec. 12, 2001

(65) Prior Publication Data

US 2003/0110422 A1 Jun. 12, 2003

(51) Int. Cl.
*G06F 11/00* (2006.01)

(52) U.S. Cl. .............. 714/4; 714/43; 714/748
(58) Field of Classification Search .............. 714/4, 714/43, 748
See application file for complete search history.

(56) References Cited

U.S. PATENT DOCUMENTS

| | | | | |
|---|---|---|---|---|
| 4,439,859 A | * | 3/1984 | Donnan | 714/748 |
| 5,371,734 A | * | 12/1994 | Fischer | 370/311 |
| 5,790,530 A | * | 8/1998 | Moh et al. | 370/363 |
| 6,684,363 B1 | * | 1/2004 | Cassiday et al. | 714/776 |
| 2001/0038634 A1 | * | 11/2001 | Dally et al. | 370/412 |

OTHER PUBLICATIONS

Roberts, Alan et al "A General Method for Deflection Worm Routing on Meshes based on Packet Routing Algorithms" IEEE 1997.*
Makedon, Fillia et al "On Bit-Serial Routing for the Mesh and the Torus" IEEE 1990.*

* cited by examiner

*Primary Examiner*—Bryce P. Bonzo

(57) ABSTRACT

A system and a method of providing error detection and correction of transmission of multiple flits between sending and receiving agents connected together in a network or computer interconnect environment is disclosed that comprises embedding a sequence identifier in each flit prior to transmission, sending each flit to a connected receiving agent, examining the sequence identifiers of each flit being received and requesting the sending agent to resend a flit if the sequence identifier for that flit is determined to be incorrect.

In a preferred embodiment of the present invention, the sequence identifier is embedded in the control portion of the flit and comprises a sequence number that is incremented or otherwise changed in a predictable manner, so that the order of flits being received is predicted. If the sequence number for a flit is different that expected, the receiving agent requests that it be resent.

19 Claims, 1 Drawing Sheet

METHOD AND SYSTEM FOR DETECTING DROPPED MICRO-PACKETS

BACKGROUND OF THE INVENTION

The present invention relates to data transmissions between agents in a network and computer interconnect fabric.

Transmissions between agents in a typical network or computer inter-connect fabric are done using "packets" which generally comprise two or more flits or micro-packets that are usually rather small, e.g., 128 bits, to ensure a short transmission time and enable easy handling by very large scale integrated (VLSI) chips along the path. In addition to the data, they contain a small control portion which contains information about the destination locations of the flit and perhaps other information. Dropped flits indicate a failure mode that is not detected by standard cyclic redundancy checking (CRC) or error correction codes (ECC) methods. Parenthetically, such dropped flits can be caused by soft errors in VLSI chips that route the flit to the wrong destination or cause it to be ignored by one of the routers. In this context, soft errors refer to stored information that is lost due to high energy particles resulting from radioactive decay (alpha particles) or gamma rays.

Prior art methods of ensuring the reliability of packet transmissions fall into two categories, i.e., flit-level error detection and correction and end to end transmission assurance. Cyclic redundancy check or error correcting codes can check the contents of a flit for errors in transmission, and depending on the code used and the nature of the error, can make corrections. This approach works well to handle error events that operate on the bit level such as electrical noise coupling on the wires used to transmit the data, or random bit flipping in the data portion of the flit.

The end to end transmission assurance involves an acknowledgement sequence between the ultimate recipient of a packet and the sending agent. With this method, the receiver of a packet immediately sends an acknowledgement packet to the sender when the complete packet is received. The sending agent must hold a complete copy of each packet sent until the acknowledgement packet is received. This approach works well in handling a large class of errors that can corrupt a packet during its transmission. The cost, however, is high since the sending agent must store all packets that are in flight and must use some sort of time out mechanism to determine if the receiver has not gotten the packet, at which time the sender is required to resend the packet. In addition there is the overhead of the acknowledgement packets consuming extra bandwidth in the network.

A need exists to easily detect dropped flits.

SUMMARY OF THE INVENTION

The present invention comprises a system and a method of providing error detection and correction of transmission of multiple flits between sending and receiving agents connected together in a network or computer interconnect environment that comprises embedding a sequence identifier in each flit prior to transmission, sending each flit to a connected receiving agent, examining the sequence identifiers of each flit being received and requesting the sending agent to resend a flit if the sequence identifier for that flit is determined to be incorrect.

In a preferred embodiment of the present invention, the sequence identifier is embedded in the control portion of the flit and comprises a sequence number that is incremented or otherwise changed in a predictable manner, so that the order of flits being received is predicted. If the sequence number for a flit is different than expected, the receiving agent requests that it be resent.

DETAILED DESCRIPTION

The present invention comprises a complimentary error detection and correction approach to the prior art methods of end to end transmission assurance and flit-level error detection and correction, such as cyclic redundancy check and error correcting codes. It is believed to provide a lower cost solution than end to end transmission assurance, but more robust method than flit-level error detection and correction. Failure modes that would not be caught by the flit-level error detection and correction method include errors in VLSI circuitry or wires causing corruption of the control portion of the flit and errors in VLSI circuitry causing the flit to be dropped or lost in its entirety.

Figure 1:
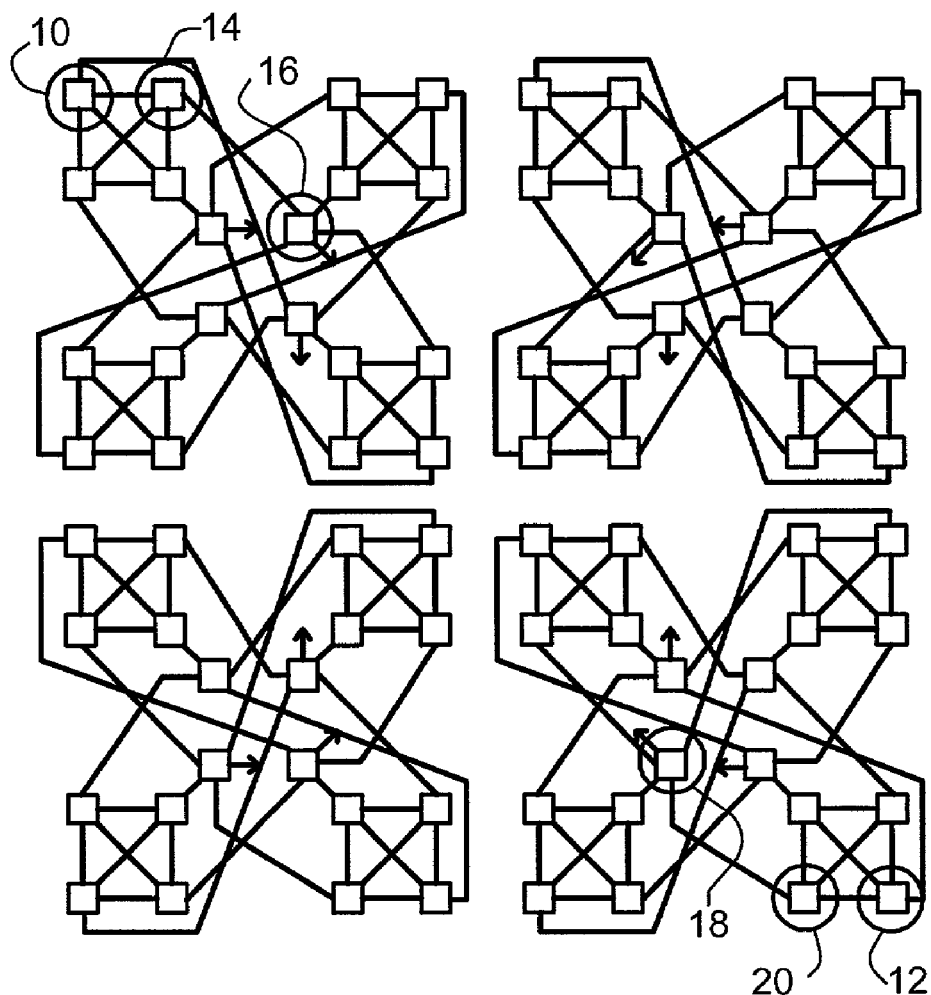
FIG. 1 is a diagram of a data packet comprising a multiplicity of flits having a control portion and a data portion.

The system and method of the present invention is intended for use in the transmission of packets comprised of multiple flits that are transmitted over one or more hops, i.e., crossing one or more agents, to arrive at a destination agent. In this regard, an agent is a processor or other VLSI chip such as a memory controller or input/output (I/O) controller connected in a multiprocessing network or fabric. As shown in FIG. 1, which diagrammatically illustrates a network with dual processor nodes and particularly illustrates transmission from agent 10 to agent 12, a flit must traverse hops between agents 14, 16, 18 and 20. In the drawing, agents 16 and 18 are directly connected together.

Figure 2:
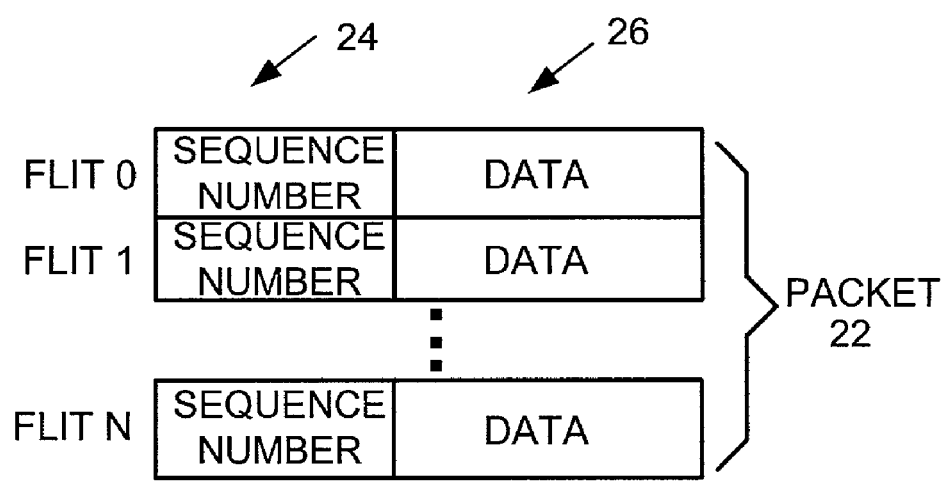
FIG. 2 is a diagram of an example of a network with dual processor nodes, and particularly illustrating a packet transmission utilizing multiple hops between two nodes.

In the present invention, and referring to FIG. 2, a packet 22 typically comprises a plurality of flits that may number from 2 to N with each flit having a control portion 24 and a data portion 26. The control portion 24 may have several fields of information such as origination information, destination and other information (not shown), but importantly to this invention a sequence identifier that is changed in a predictable manner so that the order in which flits are sent and received can be determined. While the sequence identifier may be changed in any predictable manner, the preferred embodiment merely increments a number by 1 for successive flits. This is carried out by an algorithm which in pseudo-code comprises:

```
if (new flit received {
if (flit==data flit && flit != header flit) {
Extract sequence number -> s_new;
if (s_new != s_old+1 {
{ signal error to sender:
} s_old = s_new;
}
}
```

While the foregoing algorithm is used in the preferred embodiment, any predictable incrementing or decrementing operation or digital signature or computation that enables the order of flits to be determined is within the scope of the present invention.

To detect dropped flits, the present invention in its preferred embodiment embeds a sequence number in each flit, incremented up from a value that is substantially unique for each packet. As each agent along the transmission path from sender to receiver gets the flit, it checks that this sequence number is the next in line for the packet to which it belongs. If an out of order flit is received, the agent receiving it sends a request for resend to the sending agent, which is not necessarily the original sender.

When a sequence number mismatch is detected at the receiving agent, it then signals the sending agent of a failure. This means the sending agent is required to hang on to at least one extra flit in a replay buffer to be able to resend the dropped flit since an error is not detected until after the subsequent flit is sent. In this regard, whether a copy of the flit is written into a separate replay buffer or merely retained in a memory location is largely a matter of semantics in that one of ordinary skill in the art can manipulate the flit to accomplish the retention and resending of the flit and many alternative types of manipulation are within the scope of the invention. Importantly, the amount of storage required in each agent is quite small since the re-send operation is at an agent-to-agent level, not sender to receiver. In addition, a time out mechanism is avoided since every hop on the transmission path requires either an acknowledgement, or error indication. Such communication can be arranged to consume only a single wire since it is between connected agents in the network.

Another benefit of the present invention is that a catastrophic failure of a VLSI chip somewhere in the transmission path will be detected as a missing or incomplete sequence number. This will allow the destination agent to recognize that an error has occurred in this packet and flag the error instead of continuing to consume information with silently corrupted data.

From the foregoing, it should be appreciated that a system and method of providing error detection and correction of transmission of multiple flits between sending and receiving agents has been described that has many desirable attributes and advantages compared to known prior art systems. The present invention provides a low cost solution for reliably detecting and correcting errors in transmission of flits that are incapable of being detected and corrected by known prior techniques.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A low cost method of providing error detection and correction of transmission of data units between a sending and a receiving agent connected together in a network or computer interconnect environment, the data units having a predetermined size, a control portion and an information portion, the method comprising:

the sending agent inserting a sequence identifier in each data unit, wherein said sequence identifier is the only information that is used to provide error detection;

the receiving agent examining the sequence identifiers of each data units to determine the sequence of data units being received; and, the receiving agent initiating a resend data unit communication with the sending agent before the sending agent sends a subsequent data unit if the receiving agent determines that a received data unit has an incorrect sequence identifier.

2. A method as defined in claim 1 wherein said predetermined size is within the range of about 64 to about 256 bits.

3. A method as defined in claim 2 wherein said predetermined size is about 128 bits.

4. A method as defined in claim 1 wherein said sequence identifier is a number that is changed in a predictable manner for each successive unit.

5. A method as defined in claim 1 wherein said number incremented by a known value for each successive unit.

6. A method as defined in claim 1 wherein said sequence identifier is inserted in the control portion of the data unit.

7. A method as defined in claim 1 further comprising retaining a replica of each data unit for a period of time necessary for said examining step to determine that the sequence identifier for a transmitted data unit is correct and discarding said replica when said sequence identifier for the transmitted data unit is correct.

8. A method of providing low cost error detection and correction of transmission of data packets comprising at least two flits between sending and receiving agents connected together in a network or computer interconnect environment, the flits being of a predetermined size, and having a control portion and an information portion, the method comprising:

the sending agent embedding a sequence identifier in each flit prior to transmission by a sending agent, wherein said sequence identifier is the only information that is used to provide error detection;

the sending agent sending each flit to a connected receiving agent;

the receiving agent examining the sequence identifiers of each flit to determine the sequence of flits being received; and, the receiving agent initiating a resend data unit communication with the sending agent before the sending agent sends a subsequent data unit if the receiving agent determines that a received flit has an incorrect sequence identifier.

9. A method as defined in claim 8 further comprising the step of holding a copy of each flit for a period of time necessary for said examining step to determine that the sequence identifier for a transmifted flit is correct and discarding said copy when said sequence identifier for the transmitted flit is correct.

10. A method as defined in claim 8 wherein said predetermined size is within the range of about 64 to about 256 bits.

11. A method as defined in claim 10 wherein said predetermined size is about 128 bits.

12. A method as defined in claim 8 wherein said sequence identifier is a number that is changed in a predictable manner for each successive unit.

13. A method as defined in claim 8 wherein said number is incremented by a known value for each successive unit.

14. A method for providing error detection and correction of transmission of data units between sending and receiving agents connected in a network or computer interconnect environment, the data units being of a predetermined size and having a control portion and an information portion, the method comprising:

the sending agent inserting a sequence identifier in each data unit, wherein said sequence identifier is the only information that is used to provide error detection;

the sending agent sending the data unit to the receiving unit;

the sending agent retaining a replica of the data unit in a memory;

the receiving agent examining the sequence identifiers of each data unit to determine the sequence of data units being received by the receiving agent;

the receiving agent initiating a resend data unit communication with the sending agent before the sending agent sends a subsequent data unit if it is determined that a received data unit has an incorrect sequence identifier.

15. A method as defined in claim 14 wherein said sequence identifier is inserted in the control portion of the data unit.

16. A method as defined in claim 14 wherein said predetermined size is about 128 bits.

17. A system for providing error detection and correction of transmission of data units in a network or computer interconnect environment, the data units being of a predetermined size and having a control portion and an information portion, the system comprising:

a sending agent for inserting a sequence identifier in each data unit to be sent, the sending agent retaining a replica of the data unit in a memory;

said sending agent sending the data unit to the receiving unit;

a receiving agent for receiving each data unit, the receiving unit examining the sequence identifiers of each data unit to determine the sequence of successive data units being received thereby;

said receiving agent initiating a resend data unit communication with said sending agent before the sending agent sends a subsequent data unit if it is determined that a received data unit has an incorrect sequence identifier.

18. A system as defined in claim 17 wherein said predetermined size is about 128 bits.

19. A system as defined in claim 17 wherein said sequence identifier is inserted in the control portion of the data unit.

* * * * *

UNITED STATES PATENT AND TRADEMARK OFFICE
CERTIFICATE OF CORRECTION

PATENT NO. : 7,047,437 B2  Page 1 of 1
APPLICATION NO. : 10/021170
DATED : May 16, 2006
INVENTOR(S) : Samuel Naffziger et al.

It is certified that error appears in the above-identified patent and that said Letters Patent is hereby corrected as shown below:

In column 4, line 1, in Claim 1, delete "identifiers" and insert -- identifier --, therefor.

In column 4, line 2, in Claim 1, delete "units" and insert -- unit --, therefor.

In column 4, line 40, in Claim 8, delete "identifiers" and insert -- identifier --, therefor.

In column 4, line 51, in Claim 9, delete "transmifted" and insert -- transmitted --, therefor.

In column 5, line 11, in Claim 14, delete "identifiers" and insert -- identifier --, therefor.

Signed and Sealed this

Seventeenth Day of March, 2009

JOHN DOLL
*Acting Director of the United States Patent and Trademark Office*